United States Patent [19]
Yeung et al.

[11] Patent Number: 5,875,683
[45] Date of Patent: Mar. 2, 1999

[54] CONTROLLABLE GEAR SHIFTER WITH LOCK-IN SYSTEM

[75] Inventors: Bill Yeung; Chan Yeung; Mak Tsz Fong; Li Man Chiu, all of Kowloon, Hong Kong

[73] Assignee: Suncon Toys Industry Co. Ltd., Kowloon, Hong Kong

[21] Appl. No.: 899,580

[22] Filed: Jul. 24, 1997

[51] Int. Cl.[6] .............................. F16H 59/04; F16H 57/02
[52] U.S. Cl. ...................... 74/473.12; 74/343; 74/606 R; 200/61.91
[58] Field of Search ........................ 74/335, 343, 473.12, 74/606 R; 200/61.88, 61.91

[56] References Cited

U.S. PATENT DOCUMENTS 4,790,204  12/1988  Tury et al. ............................. 74/479.12
5,370,015  12/1994  Moscatelli ............................. 74/473.12

*Primary Examiner*—Allan D. Herrman
*Attorney, Agent, or Firm*—Wallenstein & Wagner, Ltd.

[57] ABSTRACT

The present invention provides an apparatus for locking a gear train in high and low gear modes. A printed circuit board has first, second and third conductive pads, each of which are in electrical communication with a main circuit. A conductive clip having first and second contact portions is in slidable contact with the conductive pads, and is adapted to shift between a high gear position and a low gear position in response to actuation by an actuator. The low gear position is defined when the first contact portion contacts the first conductive pad and the second contact portion contacts the second conductive pad, and the high gear position is defined when the first contact portion contacts the second conductive pad and the second contact portion contacts the third conductive pad. The actuator is adapted to actuate the clip into the respective high and low gear positions in response to a signal from the main circuit and to cease actuation when the clip is at the respective high and low gear positions. The signal may, if desired, originate from a radio frequency transmitter. A gear selector is in mechanical communication with the gear train and the actuator, and is adapted to lock the gear train into the high gear mode when the clip is actuated into the high gear position and to lock the gear train into the low gear mode when the clip is actuated into the low gear position. Preferably, the clip is mounted to the gear selector and disposed between the gear selector and the printed circuit board. A method for locking a transmission into respective high and low gear modes is also disclosed.

18 Claims, 4 Drawing Sheets

CONTROLLABLE GEAR SHIFTER WITH LOCK-IN SYSTEM

TECHNICAL FIELD

The present invention relates to gear shifting apparatus and, more particularly, to a gear selector capable of shifting a gear system between high and low gear modes in response to an electrical or electromagnetic signal.

BACKGROUND OF THE INVENTION

Transmission systems are used in a wide variety of vehicles to transmit power generated by an engine or motor to torque at the vehicle's axle and wheels. Transmissions often include combinations of differently-sized gears to provide varied or shiftable gear ratios, which reflect the relationship between the turning speed of the axle and the turning speed of the shaft of the motor. Depending on the nature of the motor, the motor's power or efficiency may vary over the range of possible turning speeds. Variable speed transmissions with shiftable gear ratios enable the vehicle to realize optimal motor power over a broader range of axle speeds, and thus vehicle speeds, than is possible when only a single gear ratio is available.

In the design of miniature, remote radio frequency controlled vehicles used by children and hobbyists, a variable speed transmission is desirable in order to increase the range of speeds at which the vehicle may be operated. However, in most cases a primary goal is to reduce cost and complexity in the design of such vehicles without sacrificing utility. We have found that a two-speed transmission having a low gear and a high gear works well in toy cars and other such vehicles. The gear ratio for low gear is selected to enable the vehicle to climb grades, obstacles and rough terrain at low speed and under substantially peak motor power. The gear ratio for high gear is selected to enable the vehicle to reach high speeds at a relatively low motor revolution rate.

The present invention provides a method and apparatus for shifting a transmission between high and low gear modes and locking the transmission in either mode.

SUMMARY OF THE INVENTION

The present invention provides an apparatus for locking a gear train in high and low gear modes. A printed circuit board has first, second and third conductive pads, each of which are in electrical communication with a main circuit. A conductive clip having first and second contact portions is in slidable contact with the conductive pads, and is adapted to shift between a high gear position and a low gear position in response to actuation by an actuator. The low gear position is defined when the first contact portion contacts the first conductive pad and the second contact portion contacts the second conductive pad, and the high gear position is defined when the first contact portion contacts the second conductive pad and the second contact portion contacts the third conductive pad. The actuator is adapted to actuate the clip into the respective high and low gear positions in response to a signal from the main circuit and to cease actuation when the clip is at the respective high and low gear positions. The signal may, if desired, originate from a radio frequency transmitter. A gear selector is in mechanical communication with the gear train and the actuator, and is adapted to lock the gear train into the high gear mode when the clip is actuated into the high gear position and to lock the gear train into the low gear mode when the clip is actuated into the low gear position. Preferably, the clip is mounted to the gear selector and disposed between the gear selector and the printed circuit board.

In another embodiment, a gear shifting device is provided for use in a variable speed transmission that is capable of assuming high and low gear modes. A gear selector is mechanically linked to a gear train and is adapted to shift the gear train between the high and low gear modes in response to a signal from a main circuit. A printed circuit board has a conductive surface in electrical communication with the main circuit. A conductive clip is in slidable contact with the conductive pads. The clip is adapted to be shifted by the gear selector between high and low gear positions on the printed circuit board as the gear selector shifts the gear train between corresponding high and low gear positions. When in the high gear position, the clip permits the signal from the main circuit to change in order to lock the gear train in the high gear mode. When in the low gear position, the clip position permits the signal to change in order to lock the gear train in the low gear mode.

A method for locking a transmission into respective high and low gear modes is also provided. A gear selector as described above is placed in mechanical communication with a gear train. A conductive clip as described above is placed in mechanical communication with the gear selector and in slidable contact with a printed circuit board as described above. The main circuit then activates the gear selector to shift the gear train into either the high gear mode or low gear mode as desired. The gear selector is then locked in the high or low gear mode by permitting the gear selector to shift the clip into a respective high or low gear position, the gear positions being defined and described above.

Other features and advantages of the invention will be apparent from the following specification taken in conjunction with the following drawings.

DETAILED DESCRIPTION OF THE PREFERRED EMBODIMENT

Figure 1:
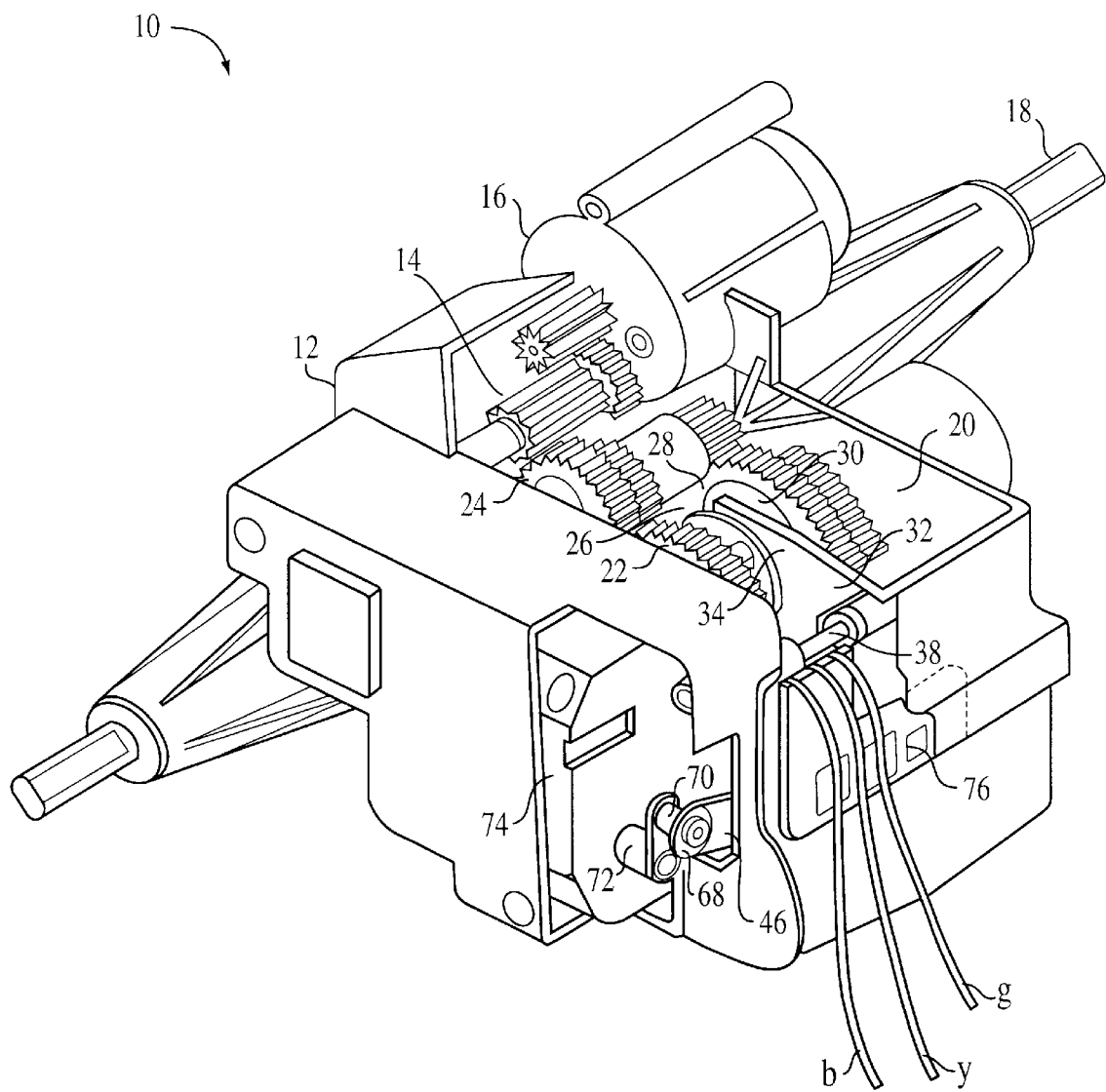
FIG. 1 is partially cut-away perspective view of a transmission assembly according to the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 shows the preferred embodiment of an assembled transmission 10 in accordance with the present invention. The transmission 10 is intended to be installed into a remote radio frequency-controlled miniature vehicle such as a toy car or truck (not shown). A gear box or housing 12 contains a gear train 14 and may be constructed of molded plastic. The gear train 14 consists of an appropriate number and configuration of gears and gear shafts for transmitting power from a drive motor 16 to an axle 18. Individual gears of the gear train 14 may be constructed of molded plastic or light-weight metal. Specifically, the gear train 14 has a low gear 20 and a high gear 22, each of which mesh with intermediate gears 24 to realize differing gear ratios according to known principles. The low gear 20 ensures a high torque output at the axle 18 at low vehicle speeds to increase the climbing ability of the vehicle. The high gear 22 permits the vehicle to operate at higher speeds under conditions where a high torque output is not necessarily required, such as where the vehicle travels on level ground.

Figure 2:
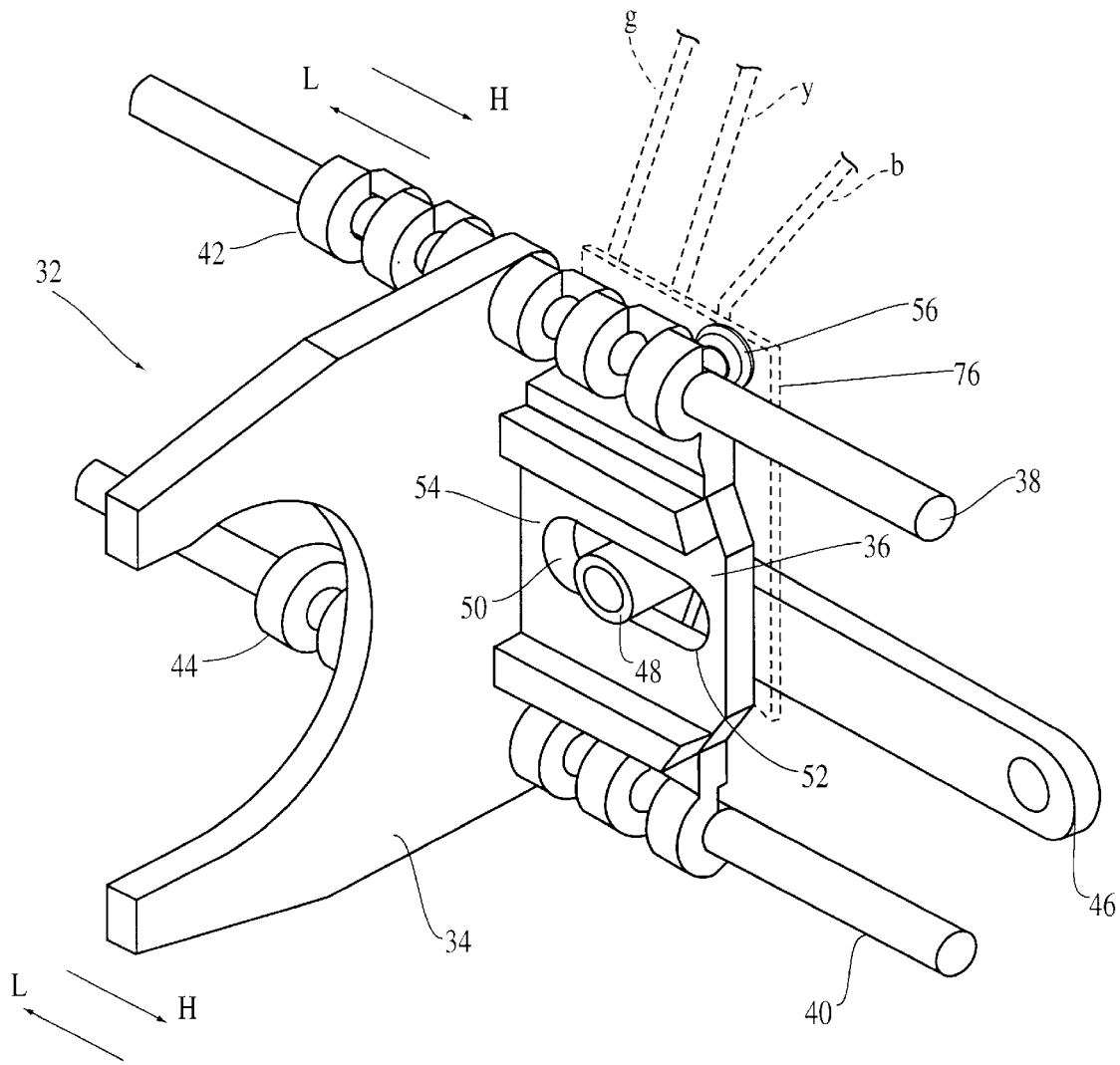
FIG. 2 is a perspective view of a gear shifter assembly according to the present invention.

A gear selector guide 26 rides on a shaft (not shown) associated with the low and high gears 20,22 and is disposed therebetween. The gear selector guide 26 is preferably wheel-shaped and has two annular flanges 30 that cooperate to form a groove 28. A gear selector 32 has a yoke end 34 that securely rests between the flanges 30 such that the yoke end 34 straddles the gear selector guide 26. The gear selector 32 and gear selector guide 26 are constructed of molded plastic. As best shown in FIG. 2, the yoke end 34 perpendicularly projects from a base plate 36 of the gear selector 32. The gear selector 32 is slidably mounted on an upper gear rail 38 and a lower gear rail 40. The base plate 36 of the gear selector 32 has an upper set of looped guides 42 into which the upper gear rail 38 is disposed. Likewise, the base plate 36 has a lower set of looped guides 44 into which the lower gear rail 40 is disposed.

Associated with the gear selector 32 is an actuator arm or gear lever 46 having a boss 48 projecting perpendicularly therefrom. The boss 48 is disposed in a slot 50 of the base plate 36 and is adapted for slidable, lateral travel between first and second ends 52,54 of the slot 50. The directions of lateral travel are indicated respectively by the arrows designated "H" and "L". In the "H" direction, the gear lever 46 moves toward the first end 52 and causes the gear selector 32 to move in the same direction. As a result, the gear selector 32 cooperates with the gear selector guide 26 to bring the high gear 22 shown in FIG. 1 into active engagement with the gear train 14 and transmit power to the axle 18 at the gear ratio associated with the high gear mode. Likewise, in the "L" direction the gear lever 46 moves toward the second end 54, such that the gear selector 32 and gear selector guide 26 cooperate to bring the low gear 20 into active engagement with the gear train 14 and transmit power to the axle 18 at the gear ratio associated with the low gear mode.

Figure 3:
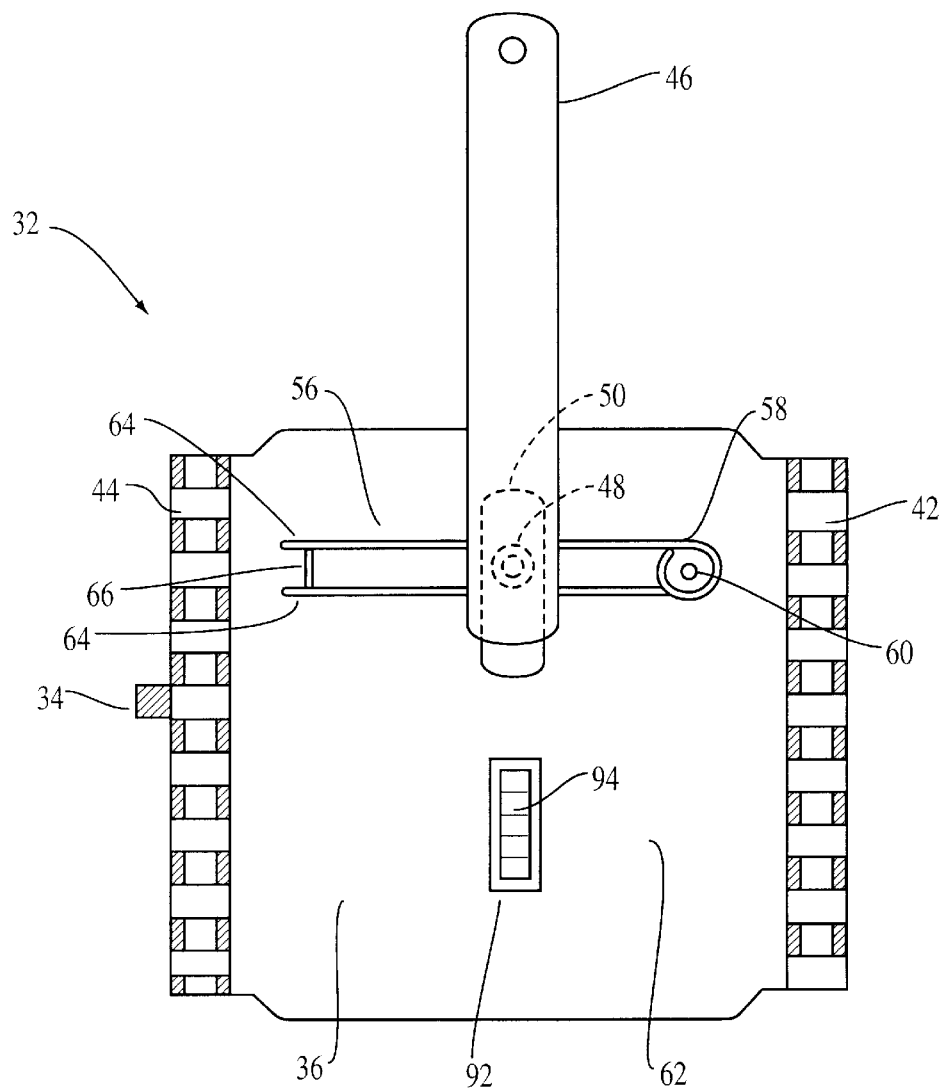
FIG. 3 is a rear elevational view of a gear selector according to the present invention.

As shown in FIG. 3, the lateral movement of the boss 48 (shown in phantom) and thus the gear lever 46 is accomplished in both "H" and "L" directions against the biasing force of a U-shaped tension spring 56. A coiled portion 58 of the tension spring 56 is disposed on a post 60 projecting from the back side 62 of the base plate 36. The legs 64 of the tension spring 56 are maintained in a substantially parallel manner by a retainer 66, which also projects from the back side 62. The slot 50 (shown partially in phantom) and thus the boss 48 and gear lever 46 are disposed between the post 60 and retainer 66. The boss 48 is retained in the slot 50 in part by the legs 64 of the tension spring 56, which abut the perimeter of the boss 48.

Referring back to FIG. 1, the gear selector 32 is shown installed in the housing 12. One end 68 of the gear lever 46 is pivotally linked by conventional means 70 to a crank end or servo arm 72 of an actuator or servo motor 74, also contained in the housing 12. The servo motor 74 provides the energy necessary to actuate the gear lever 46 against the bias of the tension spring 56. The servo arm 72 rotates in an appropriate direction in response to a processed signal from a hand-held remote control (not shown); this causes the gear selector 32 to assume a high or low gear position associated with the high or low gear modes of the gear train 14 through the medium of the gear lever 46. The tension spring 56 helps to control overrunning of the servo arm 72 as its moves the gear lever 46 between the high and low gear positions. The tension spring 56 also maintains a tensional attachment between the servo arm 72 and the gear lever 46.

Also shown in FIG. 1, and partially shown in phantom in FIG. 2, is a printed circuit board ("PCB") 76 mounted in the housing 12 adjacent the back side 62 of the base plate 36 of the gear selector 32. The PCB 76 has a contact surface or side 78 on which three contact pads 80,82,84 are disposed (see FIG. 5). A first lead wire, designated "b" for its blue insulation layer, is in soldered contact with the first contact pad 80. Similarly, a second lead wire, designated "y" for yellow, is in soldered contact with the second contact pad 82; and a third lead wire, designated "g" for green, is in soldered contact with the third contact pad 84.

Figure 5:
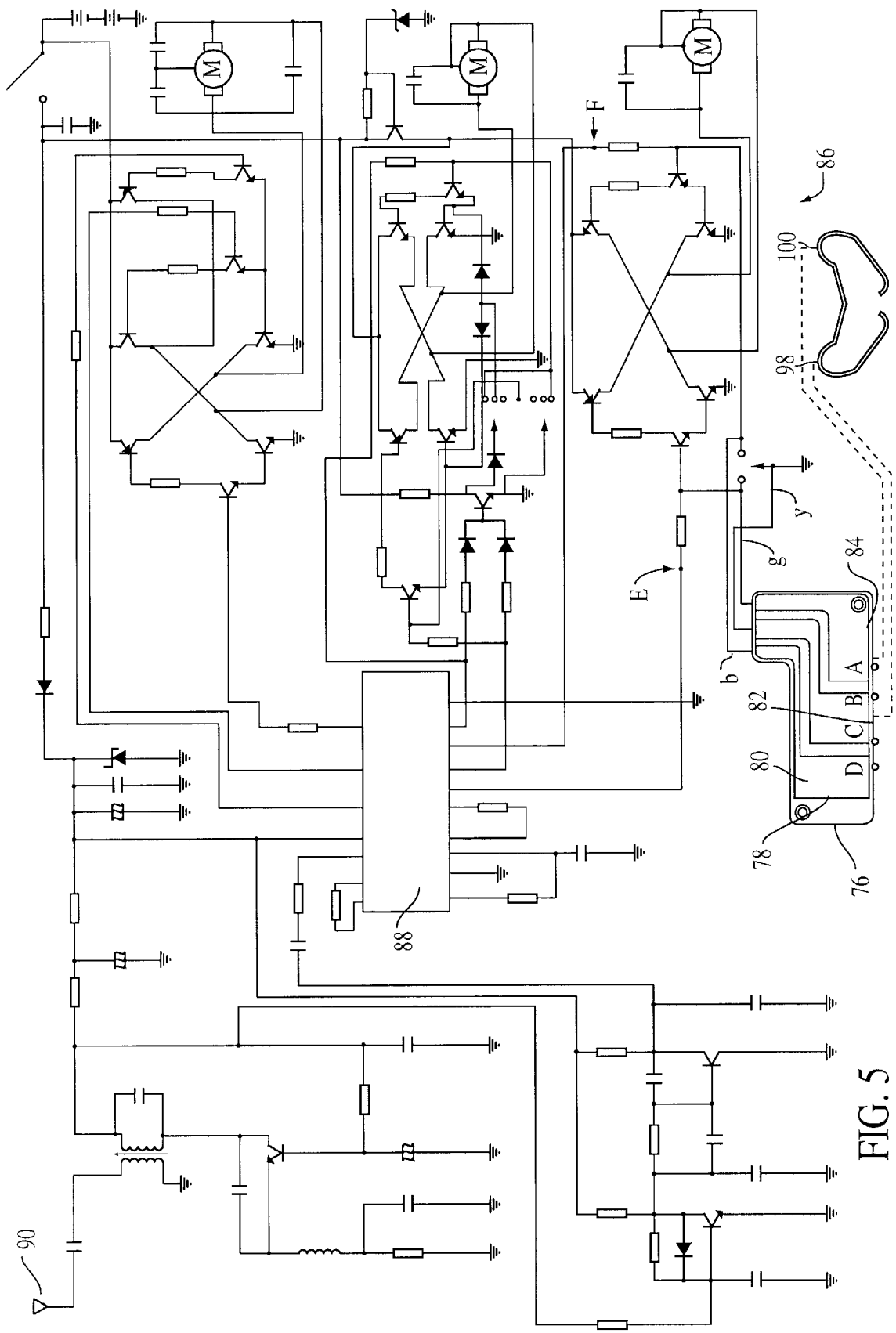

As schematically shown in FIG. 5, the lead wires b,y,g maintain electrical communication with a main circuit 86. The mounting location of main circuit 86 in the vehicle (not shown) depends on a number of factors, including the actual size of the main circuit 86 and the structural configuration of the vehicle. The types of components comprising the main circuit 86 depend on the degree and kind of functionality desired for the finished vehicle. Typically, the main circuit 86 has some form of a controller chip 88 to process signals and make logic decisions. And, for the radio frequency control contemplated by the embodiment described herein, a receiver such as an antenna 90 is associated with the main circuit 86 to pick up signals from a hand-held remote control (not shown). Other components of the main circuit 86 include circuitry for steering the vehicle.

Figure 4:
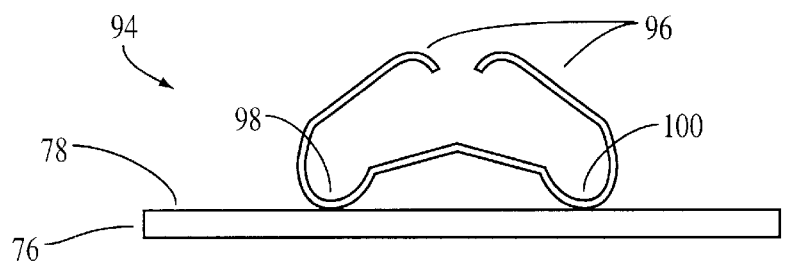
FIG. 4 is a side view of a contact clip according to the present invention; and, FIG. 5 is an electrical schematic showing a main circuit and an additional printed circuit board according to the present invention.

As shown in FIG. 3, a rectangular clip housing 92 projects out from the back side 62 of the base plate 36 of the gear selector 32 beneath the slot 50. In the finished assembly of the transmission 10, a conductive clip 94 is mounted in the clip housing 92. As shown in FIG. 4, the clip 94 has legs 96 and first and second contact portions 98,100. The clip 94 is mounted in the clip housing 92 such that its legs 96 abut the back side 62 of the base plate 36 and its first and second contact portions 98,100 contact the contact side 78 of the PCB 76. The legs 96 permit the clip 94 to act as a spring to ensure a biased contact with the PCB 76.

The clip 94 moves along the contact side 78 of the PCB 76 with the gear selector 32, between high and low gear positions as described above, and serves to establish electrical communication between lead wires b and y or between lead wires y and g. In this manner, the clip 94 combines with the PCB 76 to provide a switch between high and low gear modes. Four contact points, shown in FIG. 5 and respectively designated as "A", "B", "C"and "D", are defined on the contact side 78 of the PCB 76: Contact point A is associated with the third contact pad 84, contact points B and C are associated with the second contact pad 82, and contact point D is associated with the first contact pad 80. In high gear mode, contact is made through the clip 94 between contact points A and C. In low gear mode, contact is made between contact points B and D.

The relative dispositions and dimensions of the servo arm 72, the gear lever 46, the loot 50, and the high and low gears 22,20 may be designed such that tension spring 56 biases the boss 48 of the gear lever 46 in a central or neutral position in the slot 50 after the high and low gear modes have been fully realized. In this manner, the exact locations of the first and second contact portions 98,100 on the contact pads 80,82,84 are self-adjustable or self-correcting to ensure good electrical contact in the high and low gear modes.

In operation, the use of the PCB 76 in conjunction with the clip 94 on the gear selector 32 enables the transmission 10 of the remote controlled vehicle to switch between high and low gear modes, and lock the gear train 14 in either mode, with minimal, reliable, low-wearing mechanical effort and low consumption of electrical power. In the present embodiment, a hand-held remote control unit (not shown) is used to initiate the shifting of the transmission 10 between high and low gear modes.

To switch to high gear mode, a button or other peripheral on the remote control unit is manipulated to send a radio signal to the receiver or antenna 90 located on the vehicle. The transmitted signal may be processed or conditioned in the main circuit 86 as appropriate to determine whether the signal calls for high or low gear mode. In the present embodiment shown in FIG. 5, the voltage state at point E on the main circuit 86 will become positive or zero depending on the signal received. If point E is at a positive state, the servo motor 74 is activated to drive the gear lever 46 and thus the gear selector 32 until the clip 94 makes contact between points A and C on the PCB 76. The gear selector simultaneously brings the high gear 22 into active engagement with the gear train 14. Since point A has a zero voltage, the servo motor 74 ceases its driving action and the clip 94 and high gear 22 are locked in place until the signal is released.

To switch to low gear mode, an appropriate signal from the remote control unit is processed such that point F on the main circuit is at a positive state and point E is at a zero state. This causes the servo motor 74 to run in an opposite direction to drive the gear lever 46 and gear selector 32 until the clip 94 makes contact with points B and D. The gear selector 32 brings the low gear 20 into active engagement with the gear train 14. The servo motor 74 then shuts down and the transmission 10 remains locked in low gear mode until high gear mode is again desired.

It will be understood that the present invention may be practiced without the use of a radio transmitter and receiver. For example, the remote control unit discussed above could be tethered to the vehicle via an electrical conduit.

It will be further understood that the clip 94 and its clip housing 92 may constitute a component separate from the gear selector 32. In such a case, the shifting movement of the gear selector 32 between high and low gear modes would be physically independent of the shifting movement of the clip 94 between high and low gear positions on the PCB 76. However, the energization and the neutrality or de-energization of the servo motor 74, and thus the actuation of the gear selector 32, would still depend on whether the clip 94 has reached the high or low gear positions. But by physically isolating the shifting movements of the clip 94 and gear selector 32 it is possible to control the duration of the each shifting movement with respect to the other shifting movement. In other words, lag or lead time may be created between the two shifting movements. This alternative may be useful for such purposes as adjusting the synchronization time of meshing gears.

While the specific embodiment has been illustrated and described, numerous modifications come to mind without significantly departing from the spirit of the invention, and the scope of protection is only limited by the scope of the accompanying Claims.

What is claimed is:

1. Apparatus for locking a gear train in high and low gear modes comprising:
   a printed circuit board having first, second and third conductive pads, wherein each of the conductive pads is in electrical communication with a main circuit;
   a conductive clip having first and second contact portions in slidable contact with the conductive pads and adapted to shift between a high gear position and a low gear position in response to actuation by an actuator, wherein the low gear position is defined when the first contact portion contacts the first conductive pad and the second contact portion contacts the second conductive pad and the high gear position is defined when the first contact portion contacts the second conductive pad and the second contact portion contacts the third conductive pad; and,
   wherein the actuator is adapted to actuate the clip into the respective high and low gear positions in response to a signal from the main circuit and to cease actuation when the clip is at the respective high and low gear positions.

2. The apparatus of claim 1 wherein the printed circuit board and the gear train are disposed in a housing.

3. The apparatus of claim 1 wherein the actuator is adapted to actuate the clip in response to a signal received from a radio frequency transmitter.

4. The apparatus of claim 1 further including a gear selector in mechanical communication with the gear train, the gear selector adapted to lock the gear train into the high gear mode when the clip is actuated into the high gear position and to lock the gear train into the low gear mode when the clip is actuated into the low gear position.

5. The apparatus of claim 1 further including a gear selector in mechanical communication with the gear train and with the actuator.

6. The apparatus of claim 5 wherein the clip is mounted to the gear selector.

7. The apparatus of claim 5 further including an arm linked between the actuator and the gear selector.

8. The apparatus of claim 7 wherein the gear selector has a slot with first and second ends and the arm has a boss projecting into the slot, the boss adapted to move toward the first end when the clip is being shifted into the high gear position and to move toward the second end when the clip is being shifted into the low gear position.

9. The apparatus of claim 8 further including a spring to retain the boss in the slot.

10. The apparatus of claim 9 wherein the spring is adapted to bias the boss in a central position in the slot.

11. The apparatus of claim 5 further including a gear rail for guiding the gear selector.

12. A gear shifting device for use in a variable speed transmission capable of assuming high and low gear modes comprising:
   a gear selector mechanically linked to a gear train and adapted to shift the gear train between the high and low gear modes in response to a signal from a main circuit;
   a printed circuit board having a conductive surface in electrical communication with the main circuit; and,
   a conductive clip in slidable contact with the conductive pads and adapted to be shifted by the gear selector between high and low gear positions on the printed circuit board as the gear selector shifts the gear train between corresponding high and low gear positions, wherein the clip in the high gear position permits the signal from the main circuit to change to lock the gear train in the high gear mode and the clip in the low gear position permits the signal to change to lock the gear train in the low gear mode.

13. The device of claim 12 wherein the printed circuit board has first, second and third conductive pads on the conductive surface and the clip has first and second contact portions, wherein the low gear position is defined when the first contact portion contacts the first conductive pad and the second contact portion contacts the second conductive pad, and the high gear position is defined when the first contact portion contacts the second conductive pad and the second contact portion contacts the third conductive pad.

14. The device of claim 12 wherein the clip is disposed between the gear selector and the printed circuit board.

15. The device of claim 12 wherein the main circuit includes a receiving element adapted for receiving a signal from a radio frequency transmitter.

16. The device of claim 12 further including an actuator responsive to the signal and adapted to drive the gear selector into the high and low gear modes.

17. The device of claim 12 further including an actuator responsive to the signal and communicating with the gear selector, the actuator adapted to cause the clip to shift into the high and low gear positions.

18. A method for locking a transmission into respective high and low gear modes comprising the steps of:

placing a gear selector in mechanical communication with a gear train;

placing a conductive clip in mechanical communication with the gear selector, the clip having first and second electrical contact portions;

placing the first and second contact portions in slidable contact with a printed circuit board, the printed circuit board having first, second and third conductive pads communicating with a main circuit;

causing the main circuit to activate the gear selector to shift the gear train into the high gear mode;

locking the gear selector in the high gear mode by permitting the gear selector to shift the clip into a high gear position, the high gear position defined when the first contact portion contacts the second conductive pad and the second contact portion contacts the third conductive pad;

causing the main circuit to activate the gear selector to shift the gear train into the low gear mode; and, locking the gear selector in the low gear mode by permitting the gear selector to shift the clip into a low gear position, the low gear position defined when the first contact portion contacts the first conductive pad and the second contact portion contacts the second conductive pad.

* * * * *

UNITED STATES PATENT AND TRADEMARK OFFICE
CERTIFICATE OF CORRECTION

PATENT NO. : 5,875,683
DATED : March 2, 1999
INVENTOR(S) : Bill Yeung; Chan Yeung; Mak Tsz Fong; Li Man Chiu It is certified that errors appear in the above-identified patent and that said Letters Patent is hereby corrected as shown below:

In Column 4, Line 62, replace "the loot 50" with "the slot 50".

Signed and Sealed this

Twenty-ninth Day of February, 2000

Attest:

Q. TODD DICKINSON

Attesting Officer

Commissioner of Patents and Trademarks